May 19, 1953  W. F. WOODIN  2,638,965
TRACTOR SEAT MOUNT
Filed Nov. 29, 1950

Inventor
Walter F. Woodin
By Rudolph L. Lowell
Attorney

Patented May 19, 1953

2,638,965

UNITED STATES PATENT OFFICE 2,638,965

TRACTOR SEAT MOUNT

Walter F. Woodin, Laurens, Iowa

Application November 29, 1950, Serial No. 198,123

5 Claims. (Cl. 155—9)

This invention relates generally to farm tractor seats and in particular to a seat attachment or mounting for movably supporting a tractor seat so as to reduce the transmission of road shock to the tractor operator.

An object of this invention is to provide an improved tractor seat mounting.

A further object of this invention is to provide an attachment for a tractor seat that supports the seat for floating movement in a horizontal plane in both transverse and longitudinal directions.

Still another object of this invention is to provide a seat attachment for a tractor which floatingly supports the seat so that the tractor operator remains stationary as the tractor is rocked or tilted in its travel over an uneven ground surface.

Yet another object of this invention is to provide a tractor seat attachment which is of a simple design, capable of absorbing road shocks, and adapted to be easily and quickly installed on most types of tractors.

Further objects, features and advantages of this invention will become apparent from the following description when taken in connection with the accompanying drawings in which.

Figure 1:
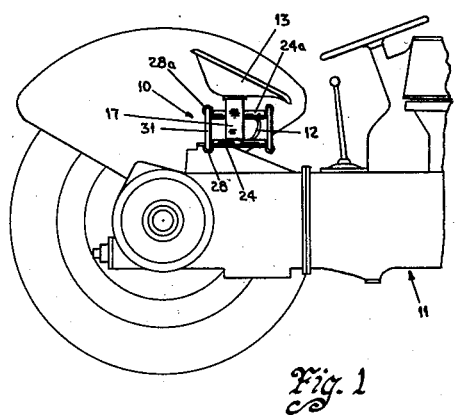
Fig. 1 is a side elevational view of the rear end portion of a tractor, showing the assembly therewith of the attachment of this invention, and with parts of the tractor being removed to more clearly show such assembly.

With reference to the drawings the seat attachment or mount of this invention, designated generally as 10, is illustrated in Fig. 1 in assembled position on a tractor 11 having an upright support 12 provided as standard equipment for the tractor seat 13. In the use of the attachment of this invention, and as will appear later, the seat 13 is mounted on the attachment, and the attachment and seat as a unit are then carried on the upright support 12.

Figure 2:
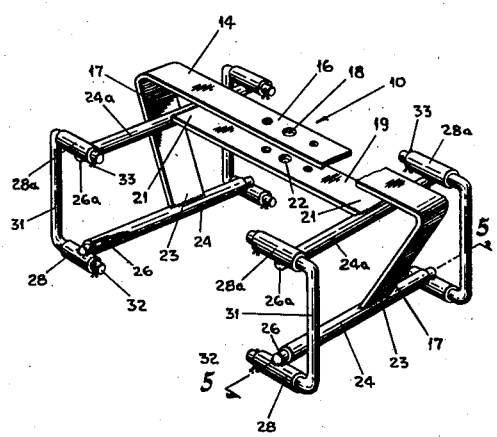
Fig. 2 is a perspective view of the seat attachment with parts broken away for clarity.
Figure 4:
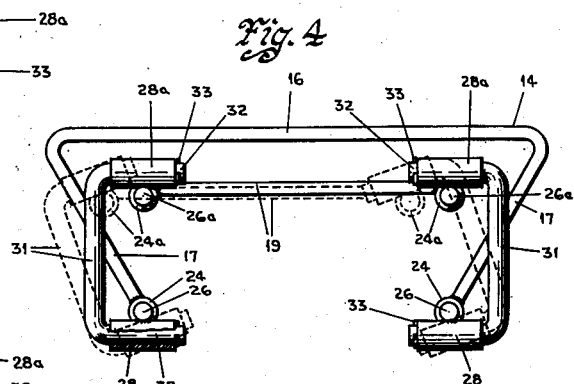
Fig. 4 is a side elevational view of the seat attachment.

The attachment 10 includes an inverted U-shaped bracket 14, formed of a flat bar material, having a base section 16 and leg sections 17 projected downwardly therefrom and inclined inwardly toward each other (Figs. 2 and 4). The base section 16 is provided with a series of bolt openings 18 for receiving seat holding bolts (not shown). An elongated tractor mounting member 19, also formed of a flat bar material, is positioned in a vertically spaced parallel relation below the base section 16. The mounting member 19 is of a shorter length than the base section 16 so that its opposite ends 21 are spaced inwardly from the leg sections 17. A series of holes 22 in the mounting member 19 provide for the attaching of such member by bolts (not shown) to the tractor seat support 12.

Secured, as by welding, to the free end 23 of each leg section 17 is a tubular bearing member 24. These tubular members 24 are arranged in a parallel relation in planes extended transversely of the bracket 14. Similar tubular members, designated as 24a, are secured to the opposite ends 21 of the mounting member 19 in a parallel relation with the tubular members 24. The inclination of the leg sections 17, relative to the length of the mounting member 19, is such that when the attachment is in what might be termed its neutral or rest position each pair of corresponding tubular members 24 and 24a are vertically disposed in a spaced relation, one above the other, namely, in a common vertical plane.

Figure 5:
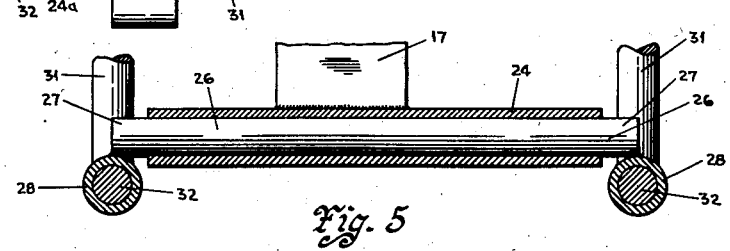
Fig. 5 is an enlarged sectional detail view taken along the line 5—5 in Fig. 2.

The bearing members 24 and 24a rotatably support corresponding rock shafts 26 and 26a, as illustrated for a tubular member 24 in Fig. 5. The opposite ends 27 of the rock shaft 26 project outwardly from the opposite ends of the tubular bearing member 24 and secured to such projected ends 27 are tubular bearing members 28. The bearing members 28 and those indicated at 28a for the rock shafts 26a have their axes extended normal to the axes of the rock shafts 26 and 26a so that the bearings 28 and 28a are arranged in parallel planes normal to the planes of the bearing members 24 and 24a.

As best appears in Figs. 2 and 4, the bearings 28 corresponding to the bearings 24 are secured to the underside of their associated rock shafts 26 and the bearings 28a corresponding to the bearings 24a, are secured to the top side of their associated rock shafts 26a. Further, by virtue of the bearing members 28 and 28a being secured to the ends 27 of the rock shafts 26, and 26a, these bearings function as stops to limit the axial movement of the rock shafts 26 and 26a relative to their associated bearings 24 and 24a.

Connected between the opposite ends of a corresponding pair of vertically disposed rock shafts 26 and 26a are upright suspension links 31 of a U-shape. The leg sections 32 of each link 31 constitute shaft portions which are rotatably received within corresponding bearings 28 and 28a. The links 31 are maintained in assembled relation within an associated pair of bearings 28 and 28a by cotter keys 33 or the like.

Assuming the mounting member 19 to be stationary it is seen that each corresponding pair of tubular bearings 24 and 24a, and associated rock shafts 26 and 26a and links 31 constitute a parallel link system providing for the movement of the bracket 14 in a horizontal plane longitudinally of the mounting member 19. During this longitudinal movement of the bracket 14 the support of the links 31 in the bearings 28 and 28a function as fixed connections. In other words, no pivotal movement of the links 31 takes place within the bearings 28 and 28a.

Similarly, a corresponding pair of shafts 26 and 26a and their associated bearings 28 and 28a and links 31 constitute a parallel link system providing for the movement of the bracket 14 in a horizontal plane transversely of the mounting member 19. In this movement, the shafts 26 and 26a function as fixed supports for the bearings 28 and 28a.

It is seen, therefore, that each pair of upright U-links 31 are common to what might be termed a dual parallel link structure, arranged at each end of the attachment 10, and with each of such structures constituting essentially a first parallel link system, movable in one vertical plane, and pivotally supported on a second parallel link system which is movable in a vertical plane normal to the vertical plane of movement of the first parallel link system.

In the use of the attachment of this invention the tractor seat 13 is removed from the support 12, and is secured to the bracket 14 at the holes 18. The attachment is then secured to the support 12 at the holes 22 in the tractor mounting member 19.

Figure 3:
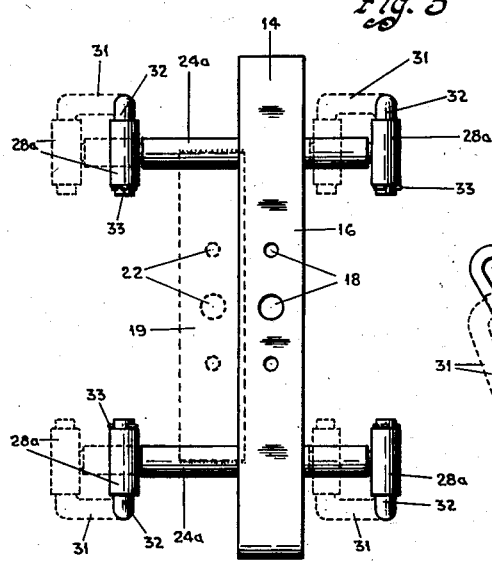
Fig. 3 is an enlarged plan view of the seat attachment shown in Fig. 2.

In operation, let it be assumed that the tractor 11 is tipped sidewise in its travel over an uneven ground surface. With the tractor operator on the seat 13, the seat tends to remain stationary while the tractor is moved relative thereto through the seat attachment of this invention. Thus with reference to Fig. 3, with the bracket 14 stationary and the tractor tilted in a longitudinal or fore and aft direction, a movement of the mounting member 19 transversely of the bracket 14 to its dotted line position, also shown in Fig. 4, takes place by the pivotal movement of the links 31 within the tubular bearing 28 and 28a, and with this movement being of an extent to accommodate the longitudinal tilting movement of the tractor.

In a like manner, when the tractor 11 is tilted sidewise, or in a transverse direction, the bracket 14 tends to remain stationary and a movement of the mounting member 19 relative to and longitudinally of the bracket 14, from its full line position to its dotted line position shown in Fig. 4, takes place by the pivotal movement of the rock shafts 26 and 26a within the tubular members 24 and 24a. It is apparent, of course, that should the tractor be concurrently tipped both transversely and longitudinally, a concurrent pivotal movement of the links 31 within the bearings 28 and 28a, and a rocking movement of the shafts 26 and 26a within the bearings 24 and 24a would also take place so as to provide for a concurrent movement of the mounting member 19 both transversely and longitudinally of the bracket 14.

It is seen, therefore, that the attachment provides what might be termed a floating support or suspension of the seat 13 which permits the tractor operator to remain stationary relative to the movement of the tractor. Stated otherwise, the tractor moves relative to the tractor operator in response to its travel over an uneven ground surface, and with the shocks and jolts resulting from such travel being absorbed by the floating action of the attachment. Thus not only does the attachment function as a shock absorbing unit, but by virtue of the seat 13 being supported in a floating position so as to remain stationary relative to the tractor, no rubbing action occurs between the seat 13 and the tractor operator so as to substantially preclude any skin irritation and soreness.

Although the invention has been described with respect to a preferred embodiment thereof it is to be understood that it is not to be so limited since changes can be made therein which are within the full intended scope of this invention as defined by the appended claims.

I claim:

1. A seat attachment for a tractor comprising an inverted U-shaped bracket member having a base section for carrying a seat, a mounting member adapted to be secured to the tractor, with said mounting member being positioned below and longitudinally of said base section between the leg sections of said bracket member, first tubular members, certain of which are fixed at each end of said mounting member and others of which are fixed to the free end of each of said leg sections, said first tubular members being arranged transversely of said mounting member in a horizontal parallel spaced relation, rock shafts corresponding to and supported within said tubular members, second tubular members fixed to each end of said rock shafts, said second tubular members being arranged in a parallel spaced relation normal to said first tubular members, and U-shaped link members, with each link member being in a substantially upright position with the terminal ends thereof rockably supported in corresponding vertically disposed pairs of said second tubular members.

2. A seat attachment for a tractor comprising a stationary member adapted to be fixed on the tractor, a movable member for carrying a seat, a first pair of oppositely arranged parallel link systems, including upright link members movably connected with said two members, to provide for the horizontal movement of said movable member transversely of said stationary member, and a second pair of oppositely arranged parallel link systems movably connected with said first parallel link systems for movement in a plane normal to the plane of movement of said first pair of parallel link systems to provide for the horizontal movement of said movable member longitudinally of said stationary member, with said upright link members being common to said first and second pairs of link systems.

3. A seat attachment for a tractor comprising an inverted U-shaped bracket having a base section for carrying a seat, a tractor mounting member arranged between the leg sections of said bracket member in a parallel spaced relation with said base section, rock shafts certain of which are rockably supported at each end of said mounting member and others adjacent the free ends of said leg sections, said rock shafts being in a parallel relation extended transversely of said mounting member, a bearing member fixed to each end of said rock shafts, said bearing members having the axes thereof normal to the axes of said rock shafts, and upright U-shape link members connected between corresponding vertically disposed ends of said rock shafts with the terminal end portions thereof rockably supported within a corresponding pair of said bearing members.

4. A seat attachment for a tractor including a mounting member, a seat supporting member arranged in a spaced parallel relation above said mounting member having lateral end portions projected downwardly and terminating below said mounting member, transversely extended rock shafts supported at each end of said two members, longitudinally extended bearing members secured to each end of said rock shafts, and upright link members of a U-shape each corresponding to a pair of bearing members disposed one above the other, with the leg sections of a link member being rotatably supported within a corresponding pair of said bearings.

5. A seat attachment for a tractor including a seat carrying member having a horizontal center section and downwardly projected end sections, a horizontal tractor mounting member arranged below said center section and between said end sections, means movably supporting said seat carrying member from said mounting member including combination parallel link systems connected between said end sections and said mounting member to provide for the movement of said seat carrying member both longitudinally and transversely of said mounting member.

WALTER F. WOODIN.

References Cited in the file of this patent

UNITED STATES PATENTS

| Number | Name | Date |
|---|---|---|
| 1,727,691 | Baum | Sept. 10, 1929 |
| 2,522,873 | Johnson | Sept. 19, 1950 |

FOREIGN PATENTS

| Number | Country | Date |
|---|---|---|
| 631,522 | France | Dec. 22, 1927 |